United States Patent [19]

Büchele-Buecher et al.

[11] Patent Number: 4,765,565
[45] Date of Patent: Aug. 23, 1988

[54] PRESSURE RELIEF VALVE ARRANGEMENT FOR A PYROTECHNIC GAS GENERATOR

[75] Inventors: Sigfrid Büchele-Buecher, Meerbusch-Strümp; Klaus Unterstein, Düsseldorf, both of Fed. Rep. of Germany

[73] Assignee: Rheinmetall GmbH., Düsseldorf, Fed. Rep. of Germany

[21] Appl. No.: 898,405

[22] Filed: Aug. 20, 1986

[30] Foreign Application Priority Data

Aug. 21, 1985 [DE] Fed. Rep. of Germany ....... 3529859
May 14, 1986 [DE] Fed. Rep. of Germany ....... 3616184

[51] Int. Cl.[4] .............................................. F02K 9/30
[52] U.S. Cl. ..................................... 244/3.22; 60/254
[58] Field of Search ..................... 60/254, 229, 39.465; 244/3.22; 102/350; 236/92 C

[56] References Cited

U.S. PATENT DOCUMENTS

| | | | |
|---|---|---|---|
| 3,073,112 | 1/1963 | Bleikamp | 60/254 |
| 3,127,739 | 4/1964 | Miller | 60/254 |
| 3,392,524 | 7/1968 | Caveny | 60/254 |
| 3,532,297 | 10/1970 | Maes | 60/229 |
| 3,599,899 | 8/1971 | McCullough | 244/3.22 |
| 3,701,256 | 10/1972 | Pelham et al. | 60/254 |
| 3,806,064 | 4/1974 | Parilla | 60/254 |
| 3,814,017 | 6/1974 | Backstein et al. | 102/70.2 |
| 4,025,912 | 5/1977 | Rice | 102/374 |
| 4,393,817 | 7/1983 | Lindberg | 123/3 |
| 4,443,180 | 4/1984 | LeFrois | 431/211 |
| 4,531,399 | 7/1985 | Aono | 73/115 |
| 4,550,888 | 11/1985 | Douglass et al. | 244/3.22 |

FOREIGN PATENT DOCUMENTS

| | | | |
|---|---|---|---|
| 498378 | 10/1919 | France | 244/3.22 |
| 1289343 | 2/1962 | France | 60/229 |

OTHER PUBLICATIONS

Robert W. Benson et al, "The Use of Shape Memory Effect Alloys as an Engineering Material", 1983, pp. 1 to 13, presented to The Society for the Advancement of Material and Process Engineering for the 15th National SAMPE Technical Conference, Oct. 4–6, 1983, Cincinnati, Ohio.

Technical Data sheet of Kistler Instruments AG, Switzerland.

Raychem Information sheet for the ELACTIV Transducer.

J. R. Yaeger, an article from *Mechanical Engineering* entitled "A Practicel Shape-Memory Electromechanical Actuator", Jul. 1984, pp. 51 to 55.

*Primary Examiner*—Stephen C. Bentley
*Assistant Examiner*—Stephen M. Johnson
*Attorney, Agent, or Firm*—Spencer & Frank

[57] ABSTRACT

A pressure relief valve arrangement forming a combination with a pyrotechnic gas generator having a housing; a combustion chamber enclosed by the housing; a pyrotechnic propellant charge disposed within the combustion chamber; control nozzles disposed in the housing and communicating with the exterior of the housing; gas channels connecting the combustion chamber with the nozzles; valve devices for opening and closing the gas channels; and a control member for actuating the valve devices. The pressure relief valve arrangement includes: a pressure sensor for measuring pressure in the combustion chamber; a temperature sensor for sensing the temperature of the propellant charge; an electronic circuit connected for receiving the output signals of the pressure sensor and the temperature sensor and for producing a signal representing a desired pressure within the combustion chamber in dependence of the temperature of the propellant and a given combustion speed of the propellant charge, and for comparing the signal representing desired pressure with the signal representing the measured pressure to produce a pressure regulating signal. A regulating device is connected to the electronic circuit for being activated by the pressure regulating signal to vent the combustion chamber when a pressure is detected therein which is in excess of the desired pressure value so as to dissipate such excess pressure.

6 Claims, 5 Drawing Sheets

PRESSURE RELIEF VALVE ARRANGEMENT FOR A PYROTECHNIC GAS GENERATOR

BACKGROUND OF THE INVENTION

The present invention relates to a pressure relief valve arrangement for a pyrotechnic gas generator in which the generator includes a housing enclosing a combustion chamber having a pyrotechnic propellant charge disposed therein, with control nozzles disposed in the housing and communicating with the exterior of the housing, gas channels connecting the combustion chamber with the nozzles, valve devices for opening and closing the gas channels, and control means for actuating the valve devices.

Pyrotechnic gas generators are useful for, among other things, the purpose of guiding missiles or for steering projectiles or missiles in their final phase of flight. In these devices, a propellant charge is converted into a gas in a combustion chamber, with the gas being conducted to control nozzles if a steering correction is required. Operation of the gas generator suitable for control purposes is possible only at constant pressure conditions within the combustion chamber, so that pressure peaks, in particular, must be avoided.

Attempts have been made to reduce such pressure peaks by means of mechanical pressure relief valves which are composed essentially of a spring-mass system. However, under the high stresses encountered in practice, mechanical pressure relief values require such a large amount of space that they can no longer be disposed in the immediate vicinity of the combustion chamber, particularly in final phase guided missiles. Moreover, due to the relatively great time constant of the spring-mass system, mechanical pressure relief valves exhibit poor response behavior which does not meet requirements in practice. Finally, the opening and closing behavior of conventional mechanical pressure relief valves includes tolerances that are too high and excludes the use of such pressure relief valves for precision guidance.

A further drawback is that the response pressure, which corresponds to the combustion chamber pressure, of such pressure relief valves is fixed and cannot be set to a variable desired pressure as a function of the temperature of the gas generator propellant charge. It is known that the combustion behavior of a propellant charge changes as a function of the existing propellant charge temperature. With a fixedly set combustion chamber pressure, the propellant charge will burn faster, for example at a propellant charge temperature of +65° C., so that the combustion time of the propellant charge is shortened and guided missiles can no longer be controlled in the final phase of their flight. However, with the same setting of the combustion chamber pressure and a lower propellant charge temperature of, for example −40° C., the resulting combustion speed is lower so that, due to the insufficiently produced gas mass stream, the thrust for transverse acceleration of the missile is insufficient.

SUMMARY OF THE INVENTION

It is an object of the present invention to provide a novel, space saving pressure relief valve for a pyrotechnic gas generator, with the valve being disposed in the immediate vicinity of the combustion chamber of, preferably, a finalphase guided projectile or missile and permitting operation of the gas generator without pressure peaks in the combustion chamber at a constant pressure level, as well as a variable setting of the desired pressure value as a function of the temperature and the required constant combustion velocity of the propellant charge.

The above and other objects are accomplished according to the invention by the provision of a pressure relief valve arrangement in combination with a pyrotechnic generator of the type described above wherein the arrangement further includes pressure sensing means operatively connected with the combustion chamber for measuring pressure in the combustion chamber and for producing an output signal representing such measured pressure; a temperature sensor means disposed in the propellant charge for sensing the temperature of the propellant charge and for producing an output signal representing the sensed temperature; electronic circuit means connected for receiving the output signals of the pressure sensor means and the temperature sensor means and for producing a signal representing a desired pressure within the combustion chamber in dependence of the temperature of the propellant charge and a given combustion speed of the propellant charge, and for comparing the signal representing desired pressure with the signal representing the measured pressure to produce a pressure regulating signal; and regulating means connected to the electronic circuit means for being activated by the pressure regulating signal to vent the combustion chamber when a pressure is detected therein which is in excess of the desired pressure value so as to dissipate such excess pressure.

BRIEF DESCRIPTION OF THE DRAWINGS

The invention will be described in greater detail below with reference to the drawings, wherein.

DESCRIPTION OF THE PREFERRED EMBODIMENTS

Figure 1:
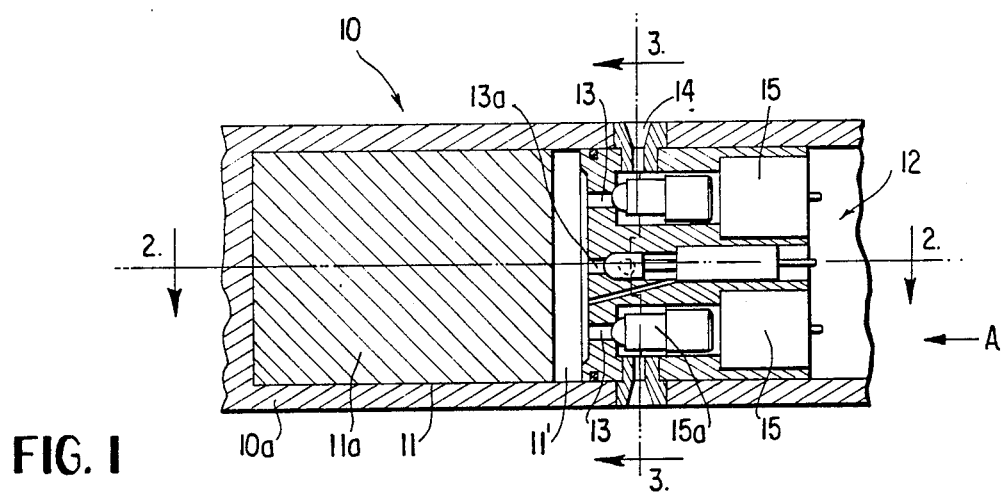
FIG. 1 is a longitudinal sectional view of a pyrotechnic gas generator according to a first embodiment of the invention.

FIG. 1 is a schematic, longitudinal sectional view of the parts of a pyrotechnic gas generator 10 required to understand the invention. A housing 10a includes a combustion chamber 11 with a pyrotechnic propellant charge 11a disposed therein. By converting the propellant charge 11a, a highly tensioned gas is produced which can be removed from the combustion chamber 11 through channels 13 which communicate with control nozzles 14 and with combustion chamber 11 through combustion chamber partition 11'. When gas exits from control nozzles 14, correction pulses are generated to correct the flight path of the missile or projectile. Channels 13 can be sealed by means of electronically actuated valves 15. Valves 15 are essentially composed of a solenoid which, when charged by a current, moves a plunger in the longitudinal axial direction. At its tip facing channel 13, each plunger is provided with a ceramic piston 15a on which a hemisphere is shaped to form a gas tight seal at channel 13.

Ceramic piston 15a is able to resist the high thermal stresses exerted on it by the hot gases exiting from channels 13 and, due to its poor heat conduction, protects the remaining parts of valve 15 against excess thermal stresses.

Optimum operation of gas generator 10 for guidance purposes is assured only if the pressure in combustion chamber 11 is as constant as possible, and in particular, if pressure peaks are avoided. For this purpose, and in accordance with the invention, a pressure relief valve arrangement is provided which is distinguished by its extremely small space requirement, fast response behavior and high accuracy in setting the desired pressure value. This pressure relief valve arrangement is composed of various components which are arranged spatially separated from one another in a control compartment 12 of gas generator 10 and thus permits optimum utilization of the very limited available space.

Figure 2:
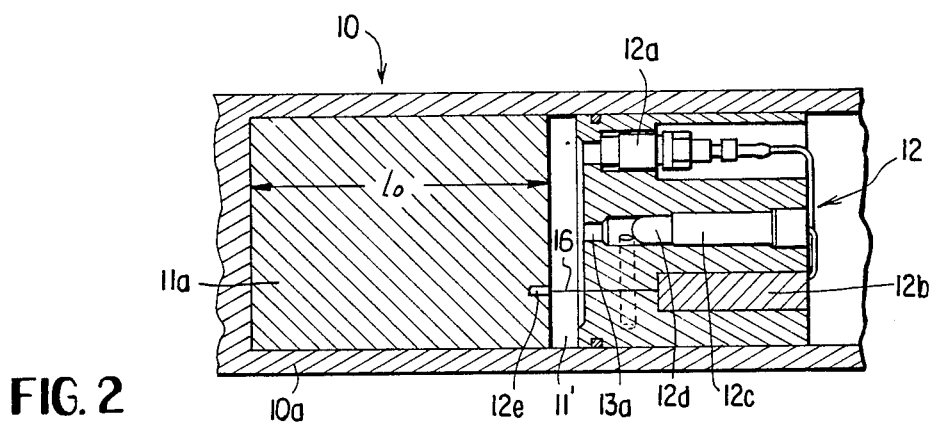
FIG. 2 is a longitudinal sectional view along line 2—2 of FIG. 1.

The pressure relief valve arrangement includes a pressure sensor 12a (FIG. 2) which is disposed in a bore so that its pressure sensing surface is exposed to the combustion chamber pressure of combustion chamber 11. A suitable pressure sensor is, for example, a quartz crystal high pressure sensor of type 6201, made by Kistler Instrumente AG, Switzerland, which is able to sense pressures up to 5000 atmospheres and is able to withstand accelerations up to about 15,000 g. When stressed with pressure, the pressure sensor converts the existing pressure value into a corresponding electrical charge. This electrical charge is fed to an electronic circuit 12b described in detail below in connection with FIGS. 8 to 10.

Figure 10:
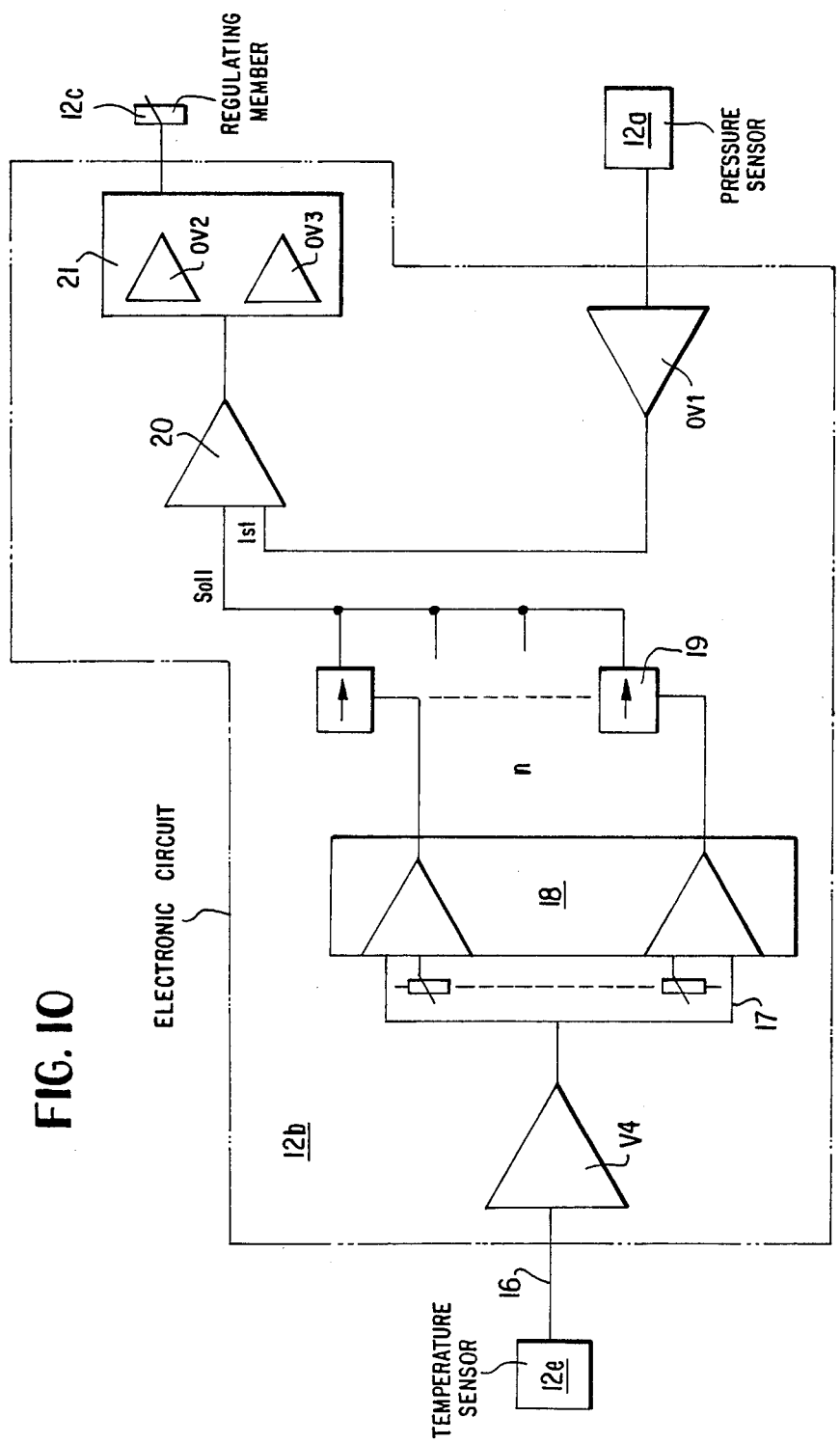
FIG. 10 is a function diagram of an electronic circuit for setting variable desired pressure values in the combustion chamber and reducing the pressure when it exceeds the desired pressure value in a pyrotechnic gas generator according to the invention.

Referring to FIG. 10, an operational amplifier OV1 of circuit 12b converts the load furnished by pressure sensor 12a into a corresponding voltage value and amplifies this value. Second and third operational amplifier OV2 and OV3 shown schematically in block 21 are connected as comparators and, in this arrangement, form a Schmitt trigger with hysteresis switching behavior.

Figure 3:
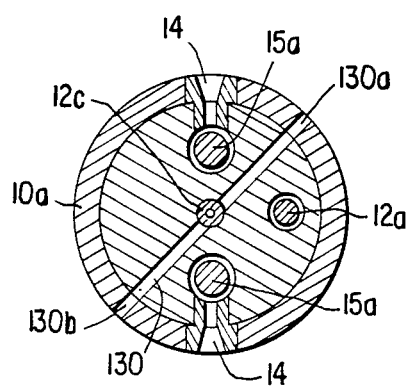
FIG. 3 is a radial sectional view along line 3—3 of FIG. 1.
Figure 4:
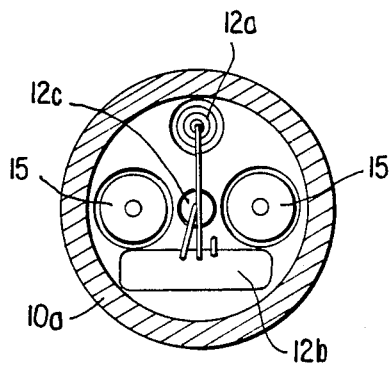
FIG. 4 is an end view in partial section of the gas generator seen in the direction of arrow A in FIG. 1.
Figure 8:
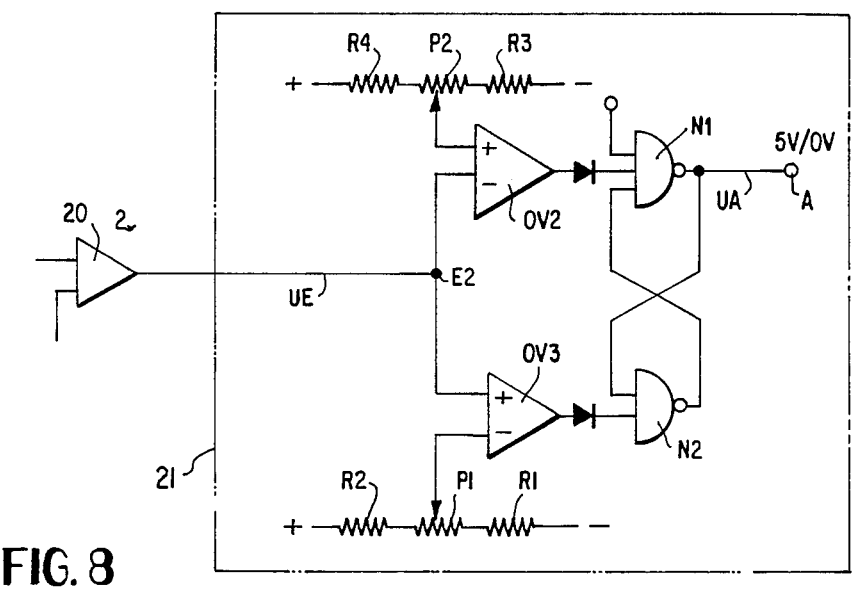
FIG. 8 is a block circuit diagram of an electronic circuit arrangement for reducing the pressure in a combustion chamber of a pyrotechnic gas generator according to the invention.
Figure 9:
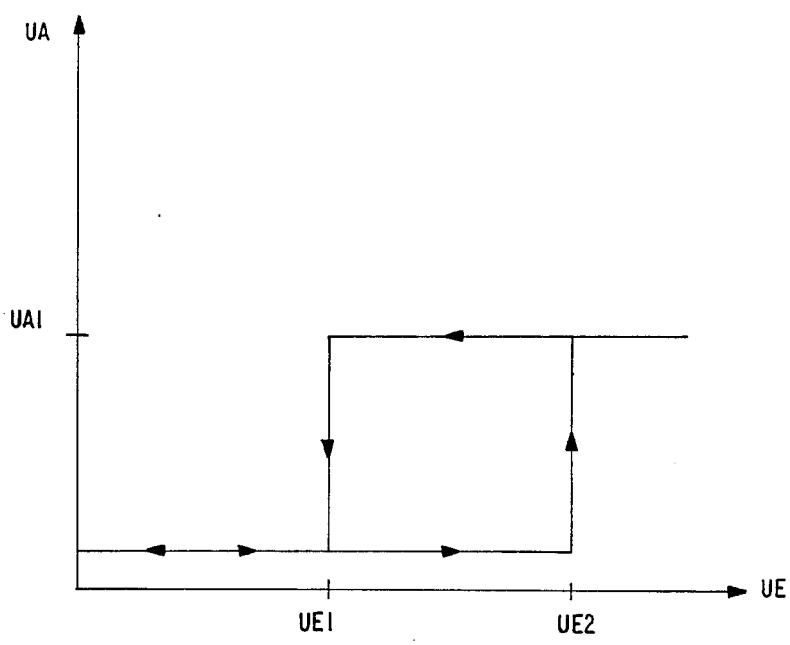
FIG. 9 is a diagram explaining the switching behavior of the electronic circuit arrangement according to FIG. 8.

FIG. 8 shows block 21 in greater detail wherein upper and lower switching thresholds of the Schmitt trigger are set separately by resistors R1, R2 and potentiometer P1, and by resistors R3, R4 and potentiometer P2, respectively. Subsequent NAND gates N1 and N2 are connected at the outputs of operational amplifiers OV2 and OV3 to form an RS flip-flop. As shown in FIG. 9, depending on the input voltage UE, switching output UA at output terminal A takes on a high or low value, for example +5 volts or 0 volts, respectively. A regulating member 12c (FIGS. 2 and 10) is responsive to switching output UA to move a ceramic piston 12d linearly forward or backward, thus opening or closing a further gas channel 13a which establishes a connection between combustion chamber 11 and a gas discharge channel 130 (FIG. 3) so as to dissipate pressure peaks within combustion chamber 11. As shown in FIG. 3, this gas discharge channel 130 is disposed diagonally in housing 10a of gas generator 10 and has diagonally oppositely disposed openings 130a and 130b so that gas discharged from channel 130 creates no force on housing 10a. The ceramic piston 12d disposed at the tip of regulating member 12c is able to resist high temperatures and is thus wear resistant; it also protects setting member 12c itself against damaging temperature influences.

To set the desired pressure value for regulating member 12c, a further component of the pressure relief valve arrangement is a heat sensor 12e (FIGS. 2 and 10) which is disposed in propellant charge 11a and which conducts its signals via a line 16 to electronic circuit 12b. Temperature sensor 12e which, in a known manner, is configured as a diode or transistor, preferably has a cylindrical shape and, with a diameter of 3 mm, requires only little space within propellant charge 11a.

Figure 11:
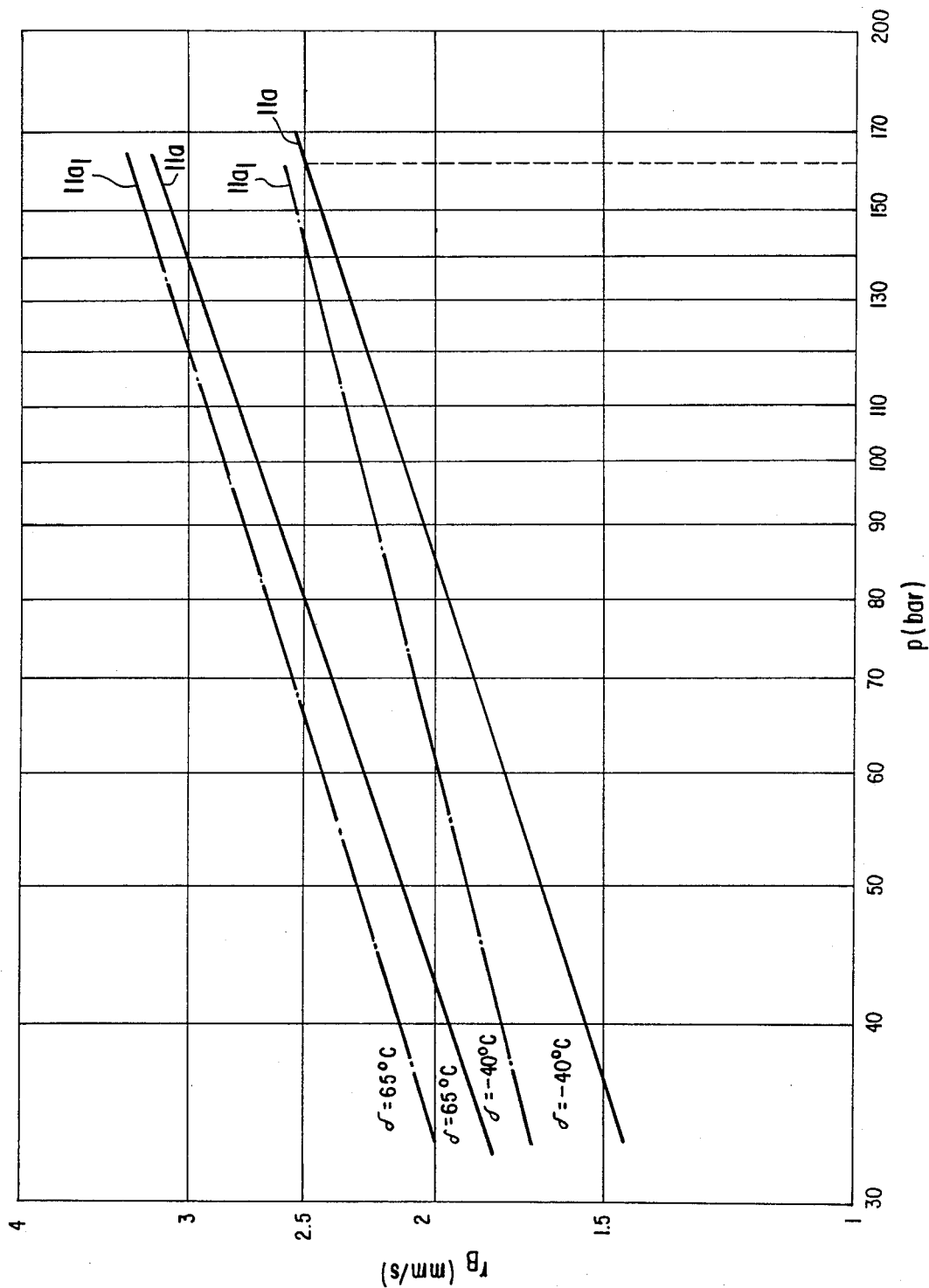
FIG. 11 is a diagram for determining the desired pressure value in the combustion chamber as a function of the combustion velocity and the initial temperature of the propellant charge.

At the beginning of the missile's flight path, heat sensor 12e is activated by the acceleration of the missile and for a few milliseconds (a maximum of 10 ms) it measures the temperature of propellant charge 11a and feeds the measured temperature to electronic circuit 12b which determines a desired operating pressure for the gases to be combusted in combustion chamber 11. This operating pressure is a function of both the propellant charge temperature $\delta$ and the combustion velocity $r_B$ of propellant charge 11a. Referring to FIG. 11, electronic circuit 12b determines the desired operating pressure p for regulating member 12c as a function of the propellant charge temperature $\delta$ at a constant, given combustion velocity $r_B$ of propellant charge 11a, with the propellant charge temperature $\delta$ lying within the limits of $-40°$ C. and $+50°$ C.

Regulating member 12c is thus particularly advantageously able to assure the desired value for combustion chamber pressure p required for optimum combustion of the propellant charge during the flight of the guided missile. FIG. 11 shows the combustion speed as pressure characteristics for two different propellants at two different temperatures. It is now possible, for example at a given combustion speed of $r_B = 2.5$ mm per second for a known propellant charge 11a, and at a propellant charge temperature $\delta$ of $+65°$ C., to set the response pressure for regulating member 12c to the combustion chamber pressure p of 80 bar or, for a propellant charge temperature of $-40°$ C., at 162 bar. The combustion chamber pressures p to be set change inevitably for other propellant charge materials. For example, in another known propellant charge $11_{al}$, the combustion chamber pressure p is only 66 bar, with the same combustion speed $r_B = 2.5$ mm/s at a propellant charge temperature $\delta = 65°$ C., and it is 138 bar for $\delta = -40°$ C.

Because it is now possible to regulate the pressure of the combustion chamber, it is no longer necessary to carry additional fuel material in the missile, as was the case in the conventional methods because of the maximum occurring propellant charge temperature that had to be considered. In the past, it was necessary, in order to assure propellant charge temperatures within the operating range under identical combustion chamber pressure values, to consider additional fuel quantities. The pressure relief valve arrangement according to the invention allows the length of the propellant charge to be designed for a length $l_0$ (FIG. 2) which corresponds to an average temperature $\delta$ of about 20° C. so that no additional fuel is required.

Due to the use of a temperature sensor, the combustion chamber pressure is regulated by the following function steps performed within electronic circuit 12b (see FIG. 10). Temperature sensor 12e senses the temperature of propellant charge 11a at firing and transmits the temperature signal to an amplifier $V_4$ for amplification and linearization. In a unit 17, voltage values are set by way of resistors as a function of the temperature and of the given combustion speed of the propellant charge. A comparison of the voltage values with stored n solutions of the mathematical function (combustion chamber pressure p = function of $\delta$ and $r_B$) is made in a comparator unit 18. In one or n connected units 19, the temperature dependent desired value is then switched through and enters a comparison unit 20 for a comparison of the desired value with the actual value. The actual pressure value is determined by means of pressure sensor 12a provided in the combustion chamber and the signal from pressure sensor 12a is conducted via load amplifier OV1, to comparison unit 20. The electrical signal required to actuate regulating member 12c is generated in end stage 21. The foregoing function of electronic circuit 12b may desirably be implemented by a microprocessor as will be appreciated by those skilled in the art.

Regulating member 12c is an electropneumatic transducer in miniature configuration, and may preferably comprise either an ELACTIV regulating member or a VEASE spring element, each made by Raychem. The ELACTIV regulating member is composed of a special memory metal. By supplying heat by means of a heating coil charged by electronic circuit 12b, regulating member 12c shrinks and thus opens gas channel 13a. This process is reversed, i.e. gas channel 13a is closed once a pressure peak has been reduced, by cooling regulating member 12c due to cessation of the supply of current, with a return spring supporting the lengthening of regulating member 12c into its rest position.

The VEASE element is a heat shrinkable spring in which shortening or lengthening can also be realized by supplying heat from a heating element charged by electronic circuit 12b.

Elongation or shortening of regulating member 12c takes place within a millisecond range so that the pressure relief valve exhibits a very good response behavior and pressure peaks in combustion chamber 11 can be reduced very quickly.

Figure 5:
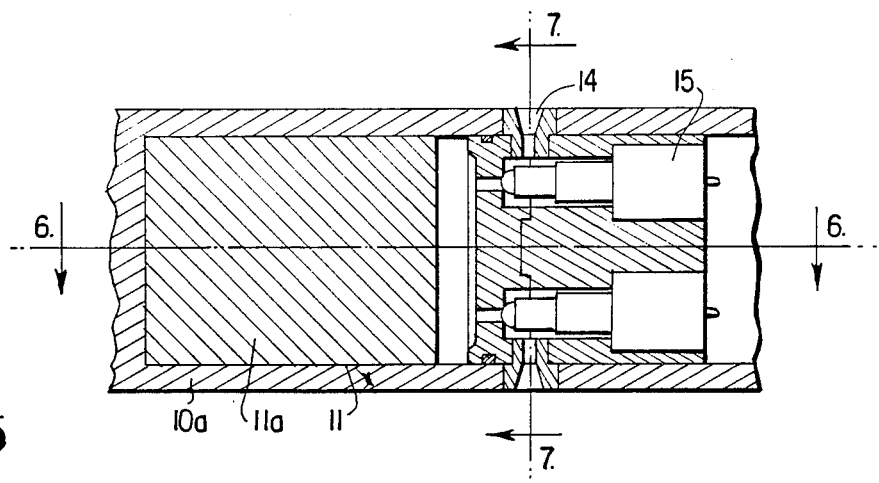
FIG. 5 is a longitudinal sectional view of a pyrotechnic gas generator according to a further embodiment of the invention.
Figure 6:
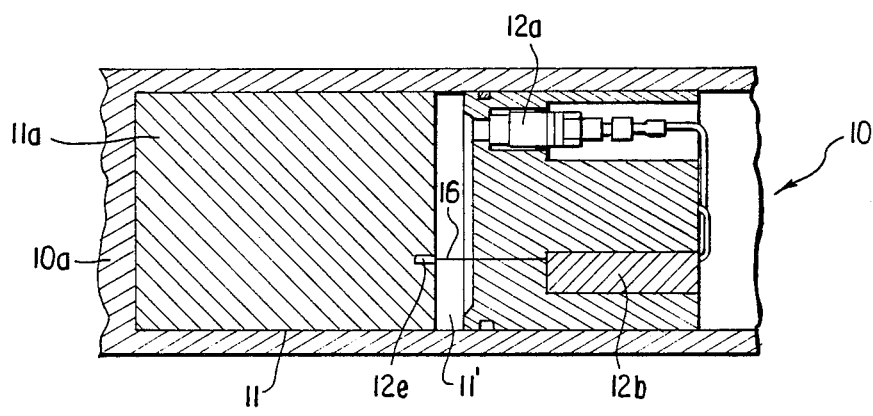
FIG. 6 is a longitudinal sectional view along line 6—6 of FIG. 5.
Figure 7:
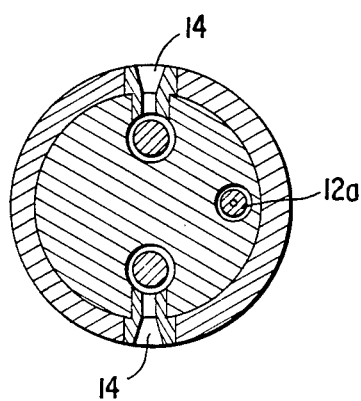
FIG. 7 is a radial sectional view along line 7—7 of FIG. 5.

A further feature of the invention will be described with reference to FIGS. 5 to 7. FIG. 5 is a longitudinal sectional view of gas generator 10. FIG. 6 is a longitudinal sectional view along line 6—6 of FIG. 5 and FIG. 7 is a radial-sectional view along line 7—7 of FIG. 5. This embodiment is distinguished by the use of even less components than the embodiment of FIGS. 1 to 4, resulting in further space and weight savings. Coinciding with the first described embodiment, there are again provided a pressure sensor 12a, an electronic circuit 12b and a temperature sensor 12e. However, to dissipate pressure peaks occurring in combustion chamber 11, this embodiment of the invention does not have a separate regulating member. Rather, if excess pressure is detected by pressure sensor 12a, valves 15 provided to charge control nozzles 14 are used to reduce the pressure in that they are temporarily opened as determined by the detected excess pressure. By simultaneously actuating diametrally oppositely disposed valves 15 with the output UA at terminal A of the Schmitt trigger shown in FIG. 8, care is taken that no steering pulse is sent to the missile or projectile.

The present disclosure relates to the subject matter disclosed in German Ser. No. P 35 29 859.6 of Aug. 21st, 1985 and German Ser. No. P 36 16 184.5 of May 14th, 1986, the entire specifications of which are incorporated herein by reference.

It will be understood that the above description of the present invention is susceptible to various modifications, changes and adaptations, and the same are intended to be comprehended within the meaning and range of equivalents of the appended claims.

What is claimed is:

1. A pressure relief valve arrangement forming a combination with a ballistic body and a pyrotechnic gas generator including: a housing; a combustion chamber enclosed by the housing; a pyrotechnic propellant charge disposed within the combustion chamber; control nozzles disposed in the housing and communicating with the exterior of the housing; gas channels connecting the combustion chamber with the nozzles; valve devices for opening and closing the gas channels; and control means for actuating the valve devices; said pressure relief valve arrangement including:

pressure sensor means operatively connected with said combustion chamber for measuring pressure in said combustion chamber and for producing an output signal representing such measured pressure;

an electrical temperature sensor means disposed in said pyrotechnic propellant charge for sensing the temperature of said pyrotechnic propellant charge and for producing an electronic output signal representing the sensed temperature;

electronic circuit means connected for receiving the output signals of said pressure sensor means and said electrical temperature sensor means and for producing a signal representing a desired pressure within said combustion chamber in dependence of the temperature of said pyrotechnic propellant charge and a given combustion speed of said pyrotechnic propellant charge, and for comparing the signal representing desired pressure with the signal representing the measured pressure to produce a pressure regulating signal; and regulating means connected to said electronic circuit means for being activated by said pressure regulating signal to vent said combustion chamber when a pressure is detected therein which is in excess of the desired pressure value so as to dissipate such excess pressure.

2. Combination as defined in claim 1, wherein said regulating means includes a gas discharge channel disposed for venting gas from said combustion chamber to the exterior of said housing without creating a force on said housing and an actuating element disposed for opening and closing said gas discharge channel, said actuating element opening said gas discharge channel in response to an excess pressure detected by said electronic circuit means to allow excess gas to escape through said gas discharge channel.

3. Combination as defined in claim 1, wherein said control nozzles include two diametrically oppositely disposed control nozzles; and said regulating means includes the valve devices which open and close the gas channels connected with said two diametrically oppositely disposed control nozzles, said valve devices of said regulating means being actuated by the pressure regulating signal of said electronic circuit means upon a detection of excess pressure in said combustion chamber, causing said two diametrically oppositely disposed control nozzles to discharge excess gas without creating a force on said housing.

4. A pressure relief valve arrangement forming a combination with a projectile and a pyrotechnic gas generator including: a housing; a combustion chamber enclosed by the housing; a pyrotechnic propellant charge disposed within the combustion chamber; control nozzles disposed in the housing and communicating with the exterior of the housing; gas channels connecting the combustion chamber with the nozzles; valve devices for opening and closing the gas channels; and control means for actuating the valve devices; said pressure relief valve arrangement including:

pressure sensor means operatively connected with said combustion chamber for measuring pressure in said combustion chamber and for producing an output signal representing such measured pressure;

an electrical temperature sensor means disposed in said pyrotechnic propellant charge for sensing the temperature of said pyrotechnic propellant charge and for producing an electronic output signal representing the sensed temperature;

electronic circuit means connected for receiving the output signals of said pressure sensor means and said electrical temperature sensor means and for producing a signal representing a desired pressure within said combustion chamber in dependence of the temperature of said pyrotechnic propellant charge and a given combustion speed of said pyrotechnic propellant charge, and for comparing the signal representing desired pressure with the signal representing the measured pressure to produce a pressure regulating signal; and regulating means connected to said electronic circuit means for being activated by said pressure regulating signal to vent said combustion chamber when a pressure is detected therein which is in excess of the desired pressure value so as to dissipate such excess pressure.

5. Combination as defined in claim 4, wherein said regulating means includes a gas discharge channel disposed for venting gas from said combustion chamber to the exterior of said housing without creating a force on said housing and an actuating element disposed for opening and closing said gas discharge channel, said actuating element opening said gas discharge channel in response to an excess pressure detected by said electronic circuit means to allow excess gas to escape through said gas discharge channel.

6. Combination as defined in claim 4, wherein said control nozzles include two diametrically oppositely disposed control nozzles; and said regulating means includes the valve devices which open and close the gas channels connected with said two diametrically oppositely disposed control nozzles, said valve devices of said regulating means being actuated by the pressure regulating signal of said electronic circuit means upon a detection of excess pressure in said combustion chamber, causing said two diametrically oppositely disposed control nozzles to discharge excess gas without creating a force on said housing.

* * * * *